US009942427B2

(12) United States Patent
Ito et al.

(10) Patent No.: US 9,942,427 B2
(45) Date of Patent: Apr. 10, 2018

(54) INFORMATION PROCESSING APPARATUS, DISPLAY CONTROL METHOD, AND STORAGE MEDIUM

(71) Applicant: CANON KABUSHIKI KAISHA, Tokyo (JP)

(72) Inventors: Koji Ito, Inagi (JP); Ryoya Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/183,669

(22) Filed: Jun. 15, 2016

(65) Prior Publication Data

US 2017/0006169 A1 Jan. 5, 2017

(30) Foreign Application Priority Data

Jun. 30, 2015 (JP) .................................. 2015-132163

(51) Int. Cl.
*G06F 3/12* (2006.01)
*H04N 1/00* (2006.01)

(52) U.S. Cl.
CPC ......... *H04N 1/0049* (2013.01); *G06F 3/1203* (2013.01); *G06F 3/1253* (2013.01); *G06F 3/1287* (2013.01); *G06F 3/1288* (2013.01); *H04N 1/00244* (2013.01); *H04N 1/00307* (2013.01); *H04N 1/00464* (2013.01); *H04N 1/00482* (2013.01); *H04N 1/00493* (2013.01)

(58) Field of Classification Search
None
See application file for complete search history.

(56) References Cited

U.S. PATENT DOCUMENTS

| 8,607,164 | B2* | 12/2013 | Tomita | H04N 1/00408 |
| | | | | 358/1.13 |
| 9,203,985 | B2* | 12/2015 | Shigetomi | H04N 1/00225 |
| 9,430,120 | B2* | 8/2016 | Cranfill | G06F 3/0482 |
| 2009/0295592 | A1* | 12/2009 | Mizukawa | G06F 3/147 |
| | | | | 340/691.5 |

(Continued)

FOREIGN PATENT DOCUMENTS

JP 2001-350667 A 12/2001

*Primary Examiner* — Dung D Tran
(74) *Attorney, Agent, or Firm* — Canon U.S.A., Inc. IP Division

(57) ABSTRACT

An information processing apparatus includes an acquisition unit, a storage control unit, and a display control unit. The acquisition unit acquires management information for managing a period during which a content update is displayed. The storage control unit controls a memory to store the acquired management information. The display control unit controls a display unit to display an object for selecting a content. When displaying the object, the display unit performs a display indicating an update of the content within a period managed by the management information, and does not perform the display indicating an update of the content out of the period managed by the management information, based on the stored management information. When displaying the content, the display control unit controls the display unit to display information indicating an update of the content within the period managed by the management information, even when the object is selected.

41 Claims, 15 Drawing Sheets

(56) References Cited

U.S. PATENT DOCUMENTS

| | | | |
|---|---|---|---|
| 2010/0085601 A1* | 4/2010 | Urakawa | H04N 1/00244 |
| | | | 358/1.15 |
| 2010/0107150 A1* | 4/2010 | Kamada | G06F 8/65 |
| | | | 717/170 |
| 2013/0332886 A1* | 12/2013 | Cranfill | G06F 3/0482 |
| | | | 715/835 |
| 2014/0380143 A1* | 12/2014 | Esguerra | G06F 17/211 |
| | | | 715/234 |

* cited by examiner

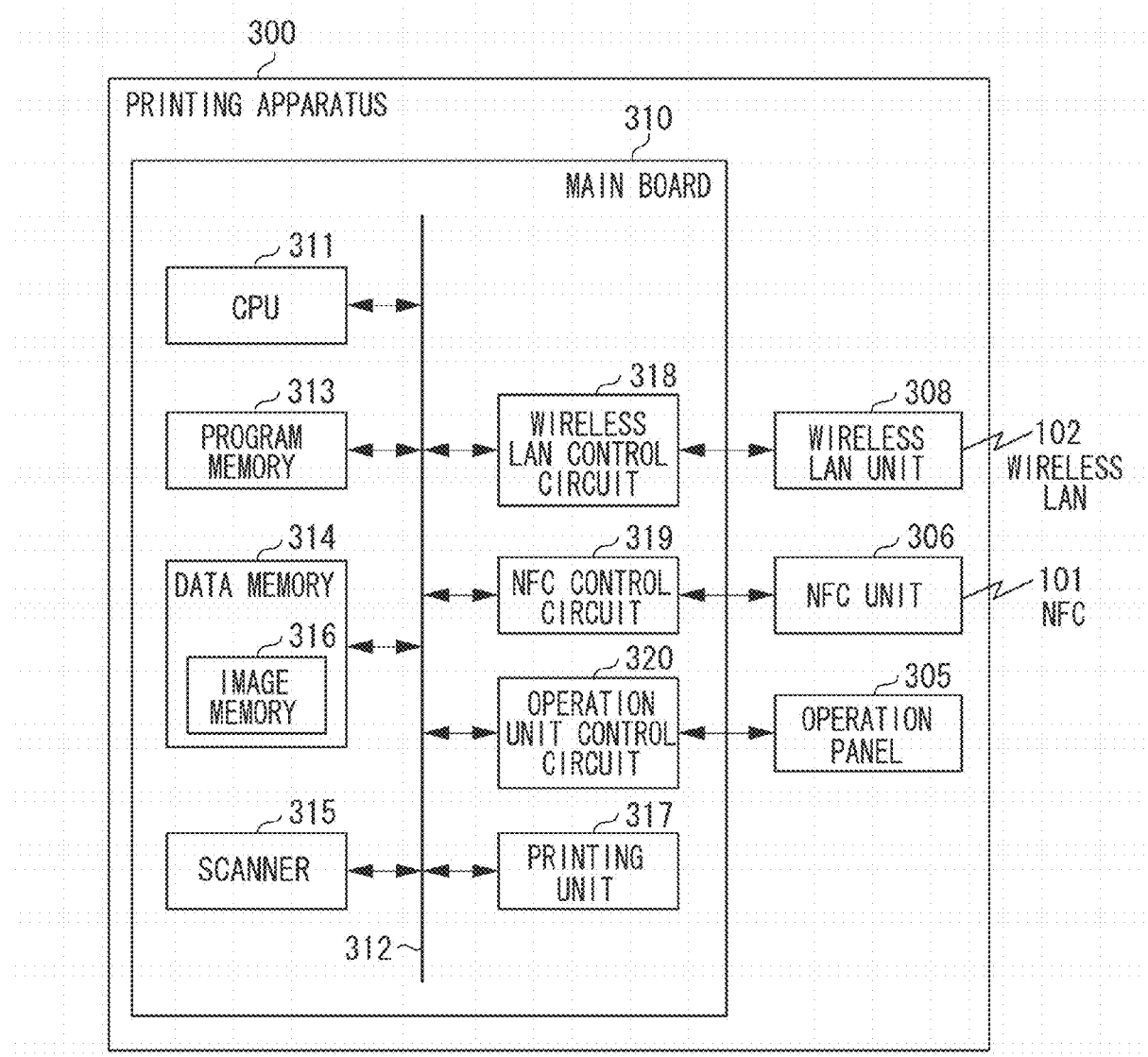

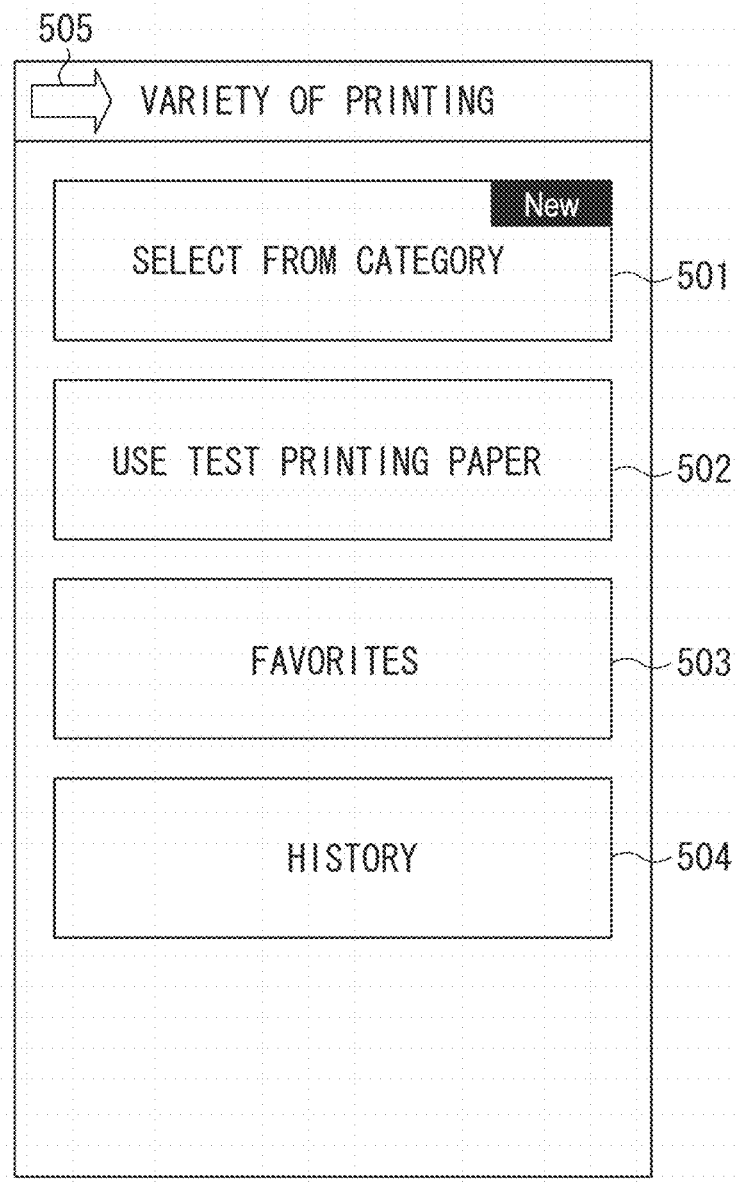

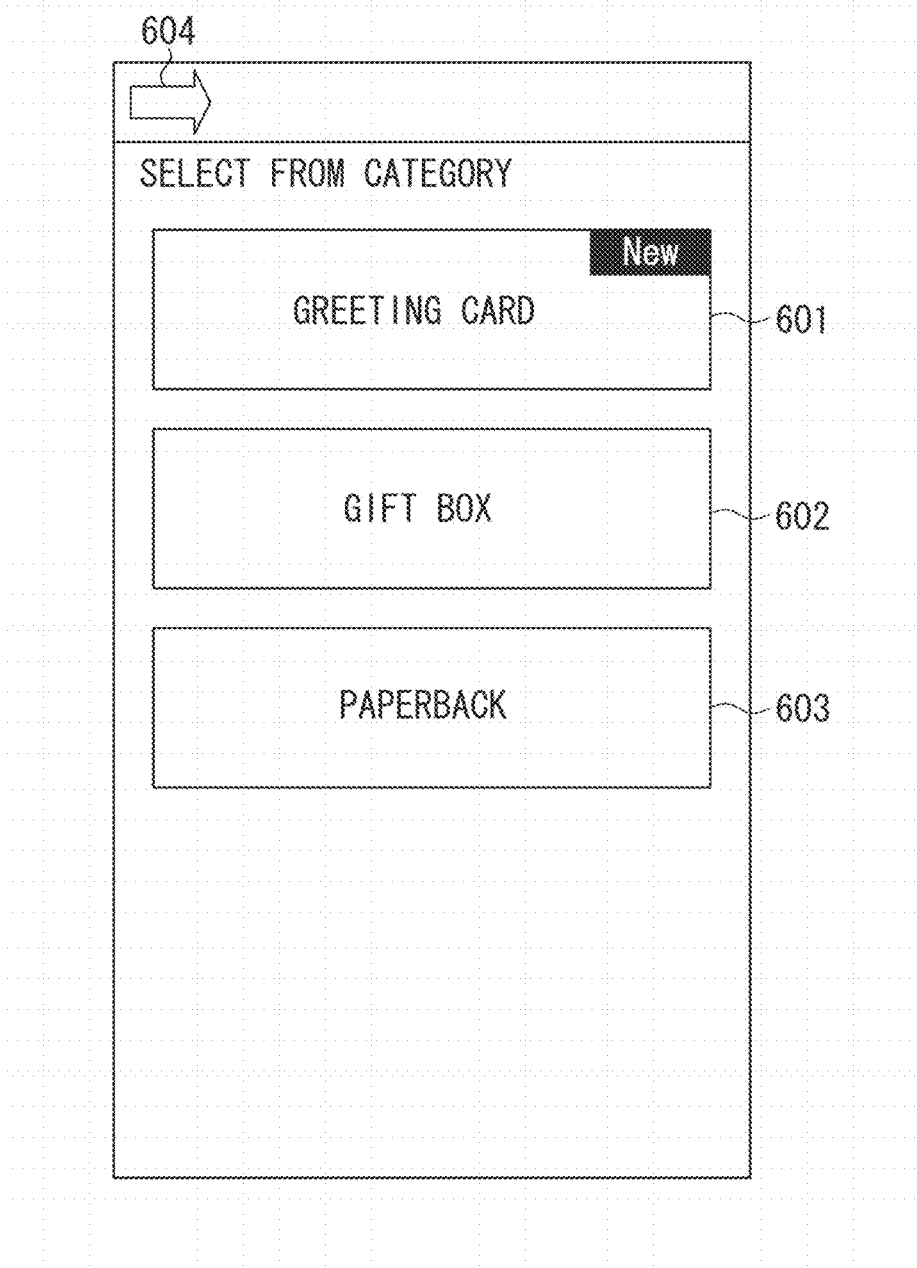

| BUTTON NAME | NEW MARK DISPLAY | DISPLAY START DATE/TIME | DISPLAY END DATE/TIME |
|---|---|---|---|
| VARIETY OF PRINTING | ON | 2015/05/20 0:00 | 2015/07/20 23:59 |
| SELECT FROM CATEGORY | ON | 2015/05/20 0:00 | 2015/06/19 23:59 |
| USE TEST PRINTING PAPER | ON | 2015/06/20 0:00 | 2015/07/20 23:59 |
| FAVORITES | OFF | ... | ... |
| HISTORY | OFF | ... | ... |

| BUTTON NAME 901 | NEW MARK DISPLAY 902 | DISPLAY START DATE/TIME 903 | DISPLAY END DATE/TIME 904 |
|---|---|---|---|
| VARIETY OF PRINTING | ON | 2015/05/20 0:00<br>2015/08/01 0:00 | 2015/06/19 23:59<br>2015/09/01 23:59 |
| SELECT FROM CATEGORY | ON | 2015/05/20 0:00 | 2015/06/19 23:59 |
| USE TEST PRINTING PAPER | ON | 2015/08/01 0:00 | 2015/09/01 23:59 |
| FAVORITES | OFF | ⋮ | ⋮ |
| HISTORY | OFF | ⋮ | ⋮ |

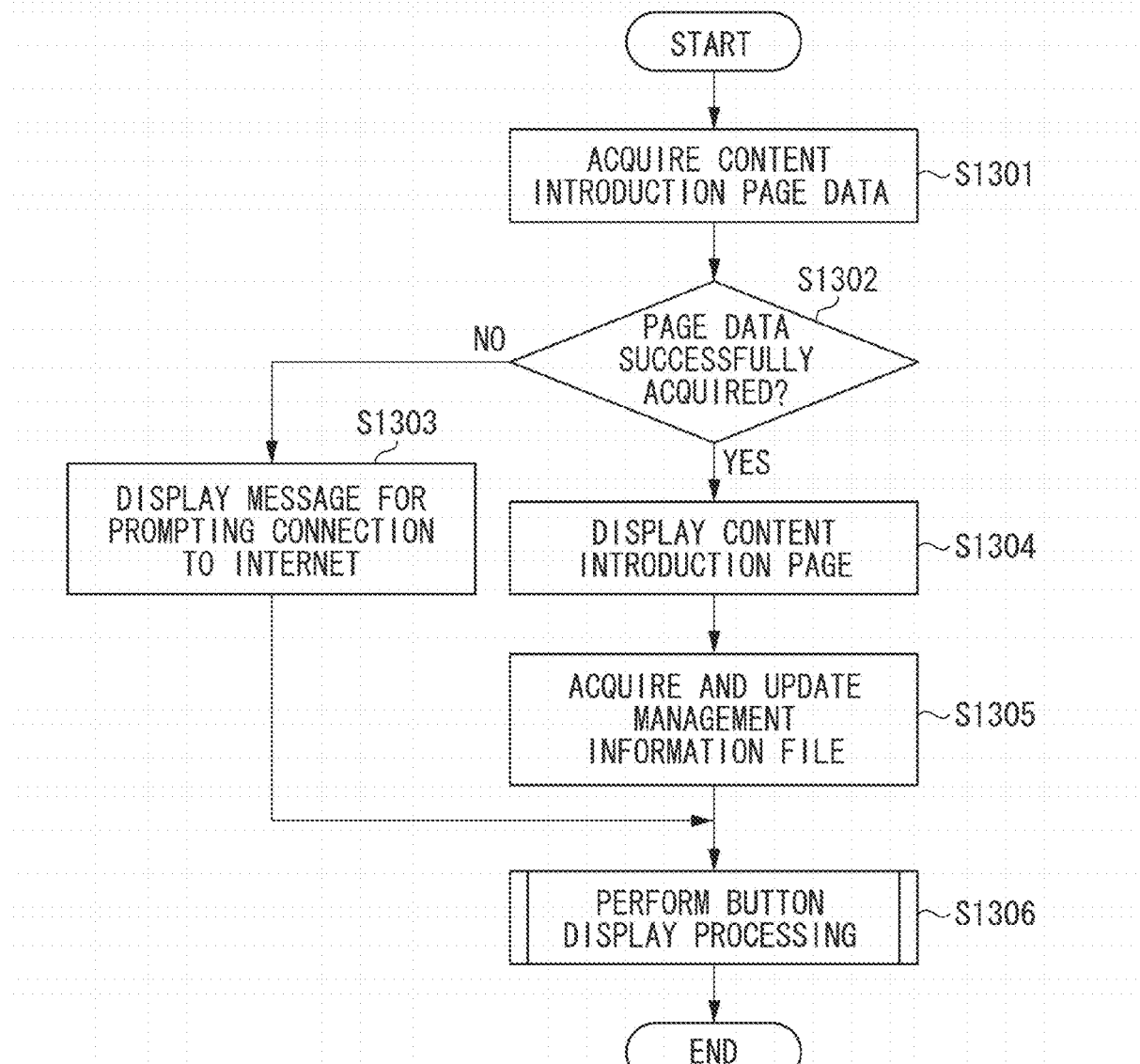

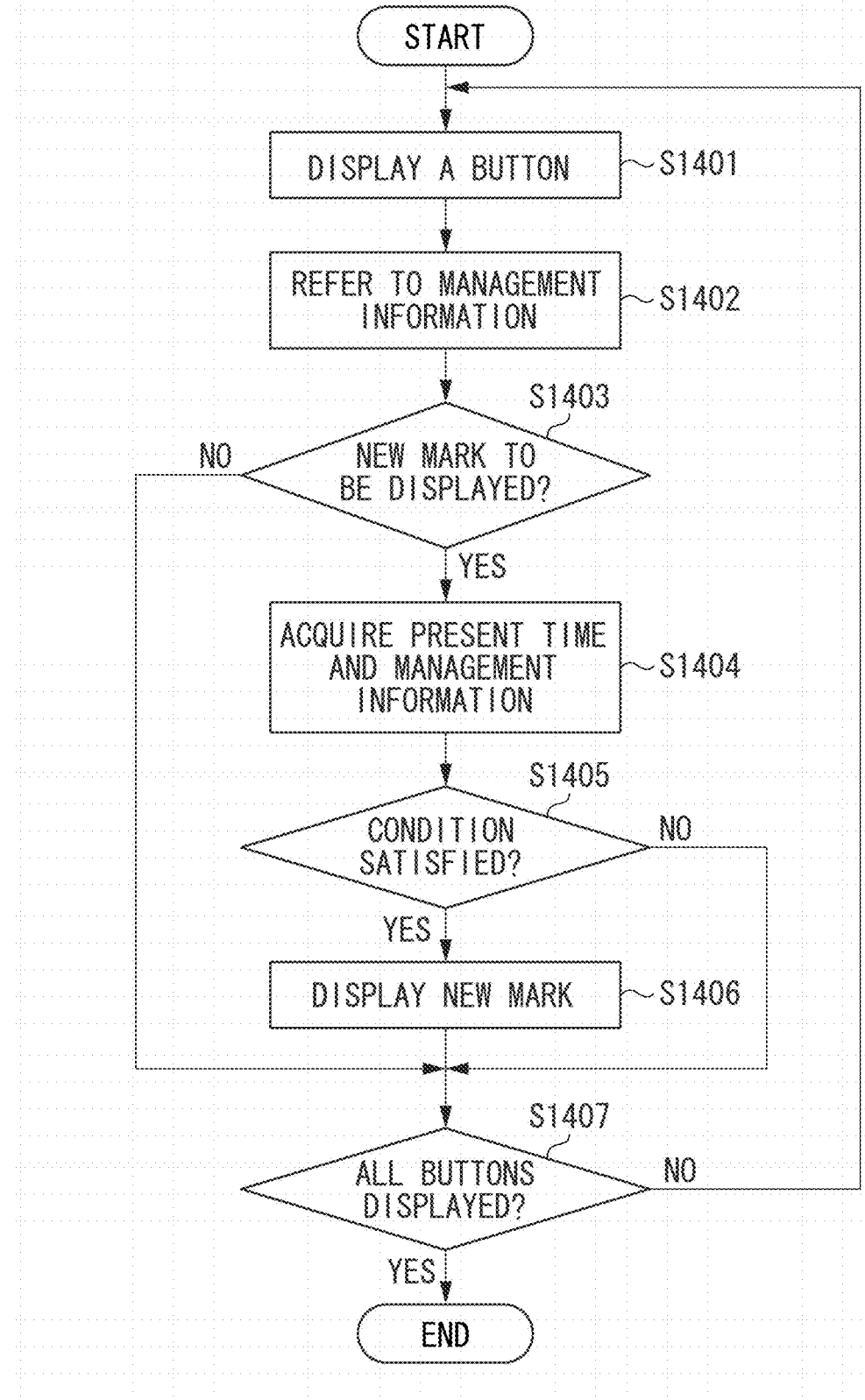

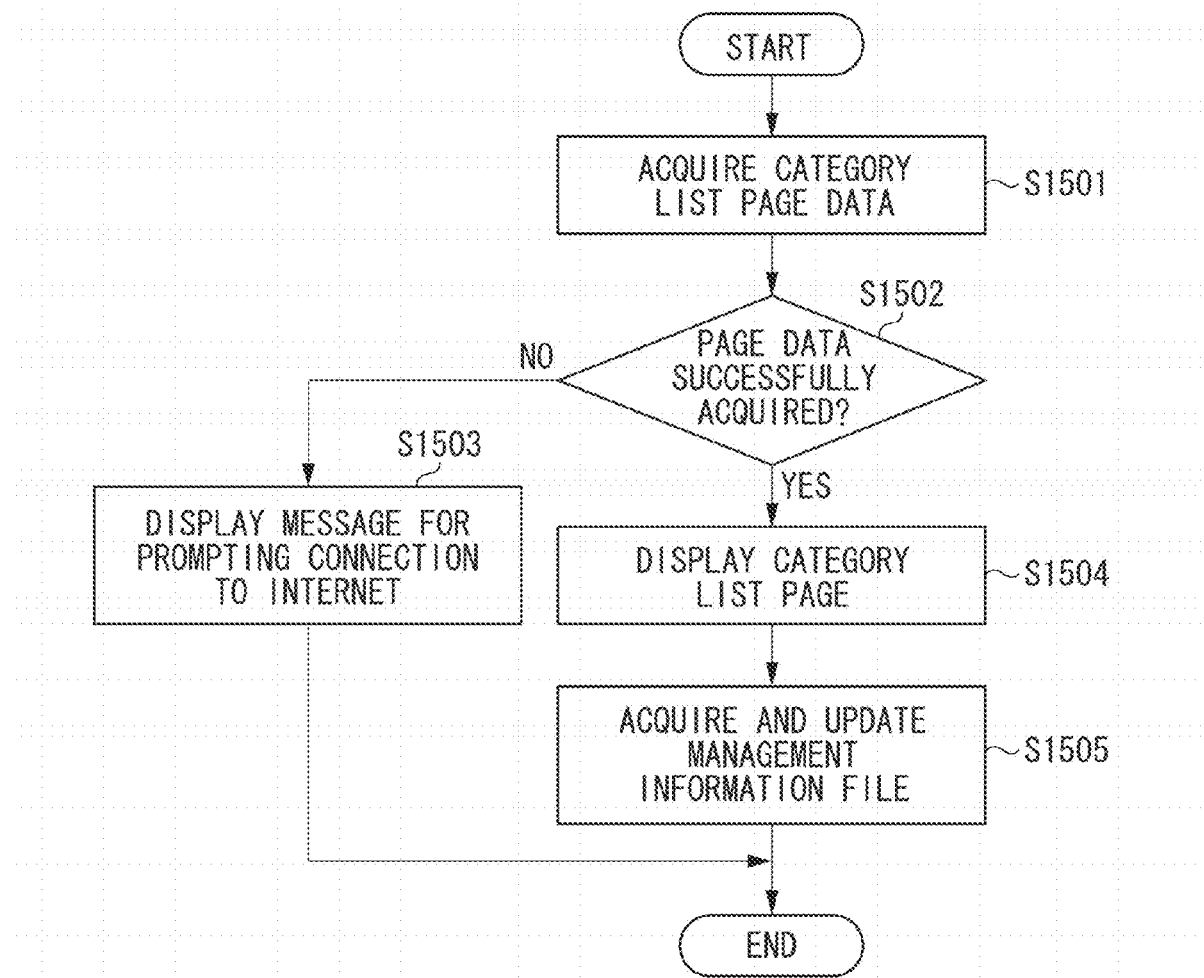

INFORMATION PROCESSING APPARATUS, DISPLAY CONTROL METHOD, AND STORAGE MEDIUM

BACKGROUND OF THE INVENTION

Field of the Invention

The present invention relates to a display control apparatus, a display control method, and a storage medium, for notifying a user of predetermined information.

Description of the Related Art

In recent years, environments for allowing individuals to easily print such items as greeting cards, labels, and menu lists have been constructed. A method is known to manage electronic, data (hereinafter also referred to as a printing content) for printing various items such as greeting cards, labels, and menu lists by using a web server, and print the data by using an application. More specifically, in a display screen provided by an application operating on an information processing apparatus, a user sequentially taps buttons provided with printing purpose and category information to select a desired printing content. Thus, the user is able to print a desired item.

When a printing content is updated on the server for managing printing contents, such an application may display a mark indicating update information on the printing content information about whether a printing content is updated exists on the server for managing printing contents. The application performs control to display or not to display the mark indicating update information by acquiring the information from the server. Meanwhile, the application may update a printing content on the server and provide the user with a predetermined printing content at a predetermined timing. Japanese Patent Application Laid-Open No. 2001-350667 discusses a technique in which a data update notification server cyclically monitors specified information contents on a network at predetermined intervals, and, when a data update is detected, notifies a data reception terminal of the data update.

However, according to the technique discussed in Japanese Patent Application Laid-Open No. 2001-350667, in an environment where information cannot be acquired from a server, the server is unable to notify a user of update information.

SUMMARY OF THE INVENTION

According to an aspect of the present invention, an information processing apparatus includes an acquisition unit configured to acquire management information for managing a period during which an update of a content is displayed from an external apparatus, a storage control unit configured to control a memory to store the management information acquired by the acquisition unit, and a display control unit configured to control a display unit to display an object for selecting a content, wherein, when displaying the object, the display control unit controls the display unit to perform a display indicating an update of the content within a period managed by the management information, and controls the display unit not to perform the display indicating an update of the content out of the period managed by the management information, based on the management information stored in the memory, and wherein, when displaying the content, the display control unit controls the display unit to display information indicating an update of the content within the period managed by the management information, even when the object is selected.

Further features of the present invention will become apparent from the following description of exemplary embodiments with reference to the attached drawings.

BRIEF DESCRIPTION OF THE DRAWINGS

FIG. 3 is a block diagram illustrating a configuration of a printing apparatus according to the first exemplary embodiment.

FIG. 5 illustrates a print screen according to the first exemplary embodiment.

FIG. 6 illustrates a category selection screen according to the first exemplary embodiment.

FIG. 9 illustrates an example of management information according to the first exemplary embodiment.

FIG. 11 illustrates another example of management information according to the first exemplary embodiment.

FIG. 13 is a flowchart illustrating top screen display processing according to the first exemplary embodiment.

FIG. 14 is a flowchart illustrating button display processing according to the first exemplary embodiment.

FIG. 15 is a flowchart illustrating category selection screen display processing according to the first exemplary embodiment.

DESCRIPTION OF THE EMBODIMENTS

An exemplary embodiment of the present invention will be described in detail below with reference to the accompanying drawings. The following exemplary embodiment does not limit the present invention. Not all of the combinations of the features described in the exemplary embodiment are indispensable to the solutions for the present invention.

Figure 1:
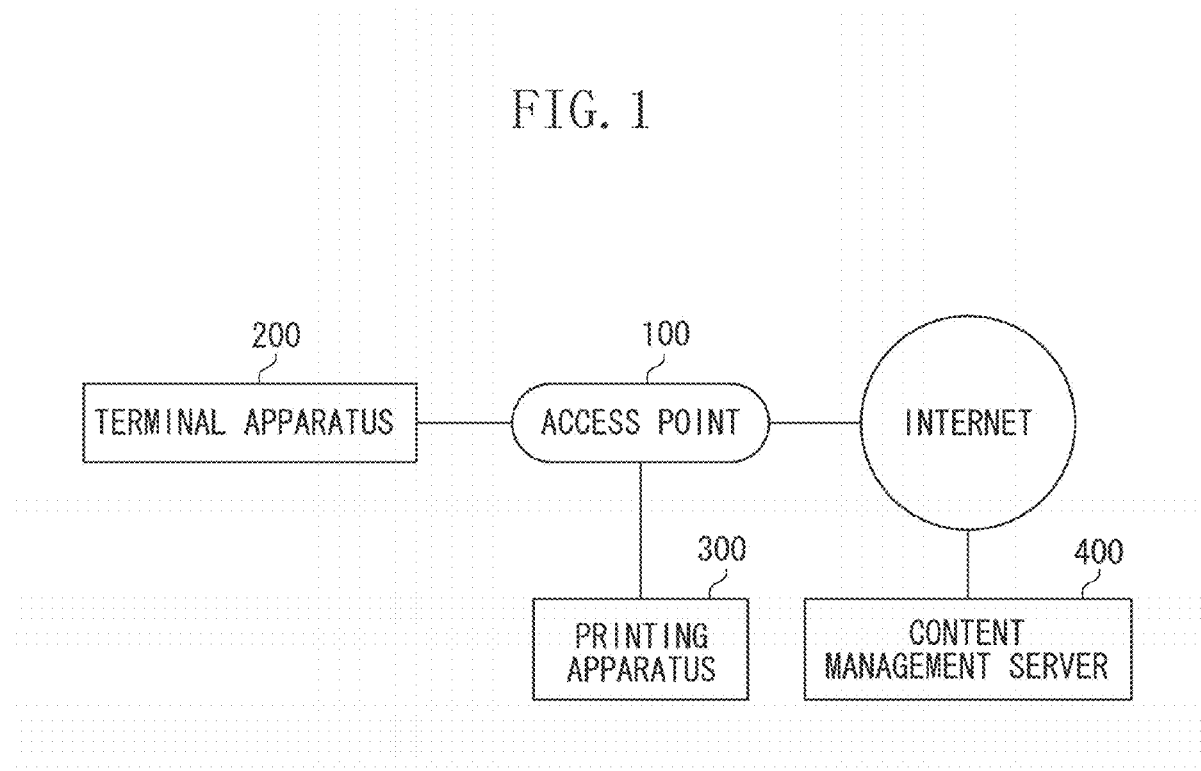
FIG. 1 illustrates a system configuration according to a first exemplary embodiment.

FIG. 1 illustrates a configuration of a print processing system. The printing system according to the present exemplary embodiment includes a terminal apparatus 200, a printing apparatus 300, and a content management server 400. The terminal apparatus 200 and the printing apparatus 300 can be connected to an access point 100, respectively.

The terminal apparatus 200 is an example of as information processing apparatus, including a personal information terminal such as a personal digital assistant (PDA), and a portable terminal apparatus such as a mobile phone and a digital camera. In the present exemplary embodiment, to acquire and print a printing content, an information processing apparatus needs to handle a printing target file. When handling other electronic data, apparatus types are not limited thereto. The terminal apparatus 200 having a communication function is capable of communicating with the content management server 400 via the access point 100 and the Internet.

The printing apparatus 300 having a printing function also functions as a communication apparatus. The printing apparatus 300 may have only the printing function, and may also have a function of reading a document placed on a document plate, a FAX function, and a telephone function. The printing apparatus 300 is capable of communicating with the terminal apparatus 200 via the access point 100 and the Internet.

The content management server 400 manages contents and is able to provide the terminal apparatus 200 with printing contents. Contents include printing contents for printing various items such as greeting cards, labels, and menu lists.

The above-described configuration enables the printing apparatus 300 to print data in the terminal apparatus 200 via a network by using a printing content provided from the content management server 400.

Figure 2:
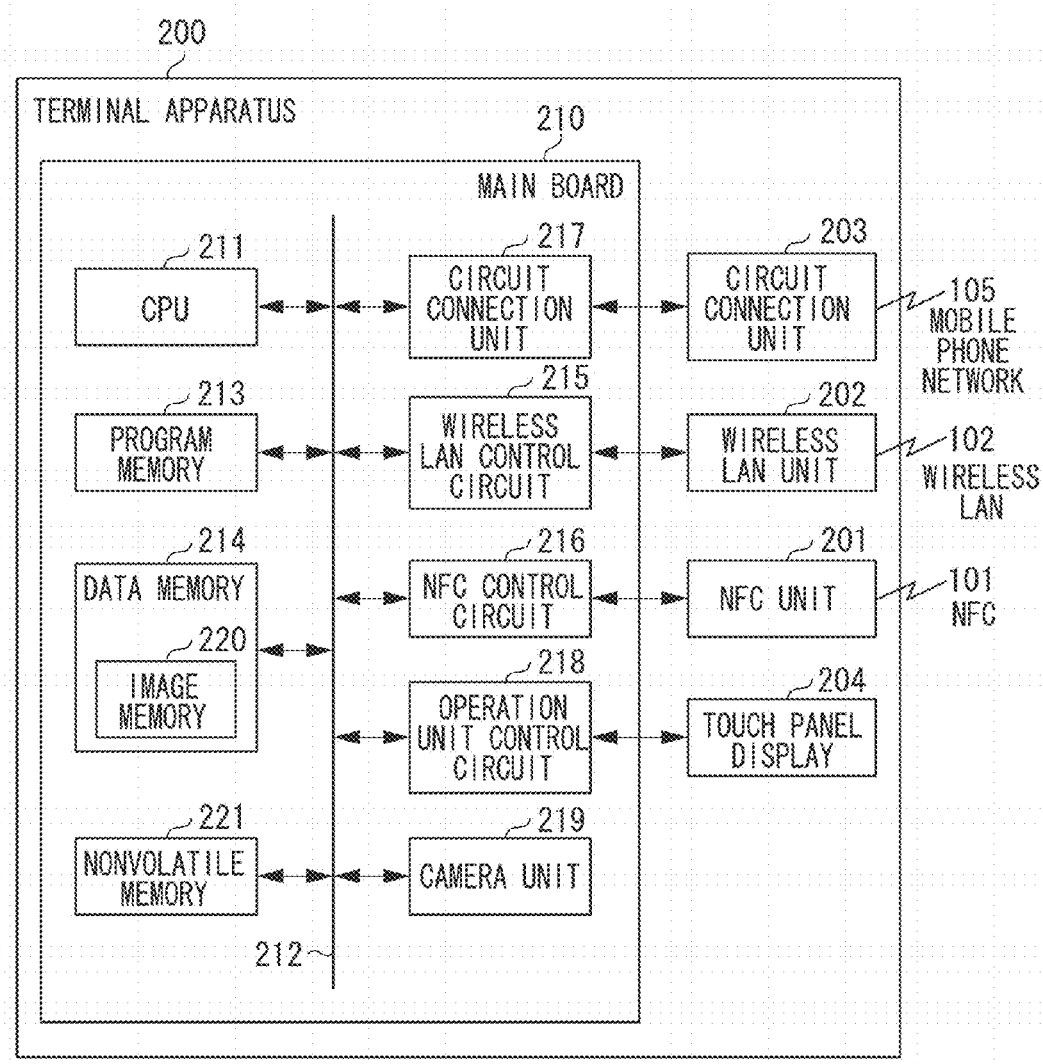
FIG. 2 is a block diagram illustrating a configuration of a terminal apparatus according to the first exemplary embodiment.

FIG. 2 is a block diagram illustrating a hardware configuration of the terminal apparatus 200. In the present exemplary embodiment, a mobile phone will be described below as an example of the terminal apparatus 200. The terminal apparatus 200 includes a main board 210 for controlling the entire terminal apparatus 200, a wireless local area network (LAN) unit 202, a near field communication (NFC) unit 201, a circuit connection unit 203, and a touch panel display 204.

The NFC unit 201 is an interface for communication via an NFC 101. The wireless LAN unit 202 is an interface for communication via a wireless LAN 102. The circuit connection unit 203 is an interface for communication via a mobile phone network 105. In the present exemplary embodiment, although the terminal apparatus 200 is described to be capable of communication via the mobile phone network 105, the wireless LAN 102, and the NFC 101, the terminal apparatus 200 is not limited thereto. For example, the terminal apparatus 200 may be capable of communication via other interfaces, and may also be unable to communicate with the NFC 101 or the mobile phone network 105.

The touch panel display 204 is provided with an operation mechanism on a liquid crystal display (LCD). Although, in the present exemplary embodiment, an operation unit is integrally formed with at least a part of a display unit, the configuration is not limited thereto. The display unit may be provided separately from the operation unit. The touch panel display 204 displays a screen provided by an application.

The main board 210 includes a central processing unit (CPU) 211, a program memory 213, a data memory 214, a wireless LAN control circuit 215, an NFC control circuit 216, a circuit connection unit 217, an operation unit control circuit 218, a camera unit 219, and a nonvolatile memory 221. These components are connected with each other via an internal bus 212.

The CPU 211 is a microprocessor for controlling operations of the entire terminal apparatus 200. The CPU 211 operates according to a control program stored in the program memory 213 and contents of the data memory 214. These memories are connected to the CPU 211 via the internal bus 212. The program memory 213 is, for example, a read only memory (ROM). The data memory 214 is, for example, a random access memory (RAM). The data memory 214 is a memory area required for operations of the CPU 211. The data memory 214 is used as a work area for the CPU 211 and an area for temporarily storing various received data. The data memory 214 is also used to store various setting data.

The CPU 211 controls the wireless LAN unit 202 via the wireless LAN control circuit 215 to communicate with other communication terminal apparatuses via the wireless LAN 102. The CPU 211 controls the NFC unit 201 via the NFC control circuit 216 to enable detecting connection with other NFC terminals via the NFC 101, and transmitting and receiving data to/from other NFC terminals. The CPU 211 controls the circuit connection unit 203 via the circuit connection unit 217 to enable connecting to the mobile phone network 105, making a telephone call, and transmitting and receiving data.

The CPU 211 controls the operation unit control circuit 218 to perform a display on the touch panel display 204 and receive an operation from a user. The CPU 211 controls the camera unit 219 to capture an image and stores data of the captured image in an image memory 220 in the data memory 214. In addition to data of captured images, the CPU 211 further stores in the image memory 220 image data acquired from the outside via the mobile phone network 105, the wireless LAN 102, and the NFC 101. The CPU 211 is also capable of transmitting image data of the image memory 220 to the outside.

The nonvolatile memory 221 including a flash memory stores such data that is to be retained even after power is turned OFF. For example, the nonvolatile memory 221 stores telephone directory data, various communication connection information, and information of previously connected devices. The nonvolatile memory 221 also stores image data to be preserved and programs such as application software for implementing various functions on the terminal apparatus 200.

Application programs according to the present exemplary embodiment, WebView programs for processing printing contents, and printing content data acquired from the management server are also stored in the nonvolatile memory 221. WebView is software having a function of interpreting the HyperText Markup Language (HTML) used for Web page drawing and a function of controlling screen display. Incorporating WebView in an application enables easily controlling the HTML. Printing contents can be acquired via the mobile phone network 105 and the circuit connection unit 203, or via the wireless LAN 102 and the wireless LAN unit 202.

FIG. 3 is a block diagram illustrating a hardware configuration of the printing apparatus 300. In the present exemplary embodiment, a multifunction printer having a printing function and a reading function will be described below as an example of the printing apparatus 300.

The printing apparatus 300 includes a main board 310 for controlling the entire apparatus, a wireless LAN unit 308, an NFC unit 306, and an operation panel 305.

The NFC unit 306 is an interface for communication via the NFC 101. The wireless LAN unit 308 is an interface for communication via the wireless LAN 102.

The main board 310 includes a CPU 311, a program memory 313, a data memory 314, a scanner 315, a printing unit 317, a wireless LAN control circuit 318, an NFC control circuit 319, and an operation unit control circuit 320. These units are connected with each other via an internal bus 312.

The CPU 311 is a microprocessor for controlling operations of the entire printing apparatus 300. The CPU 311 operates according to a control program stored in the program memory 313 and contents of the data memory 314. These memories are connected to the CPU 311 via the internal bus 312. The program memory 313 is, for example, a ROM. The data memory 314 is, for example, a RAM. The data memory 314 is a memory area required for operations of the CPU 311. The data memory 314 is used as a work area for the CPU 311 and as an area for temporarily storing various received data. The data memory 314 is also used to store various setting data.

The CPU 311 controls the wireless LAN unit 308 via the wireless LAN control circuit 318 to communicate with other communication terminal apparatuses via the wireless LAN 102. The CPU 311 controls the NFC unit 306 via the NFC control circuit 319 to enable detecting connection with other NFC terminals via the NFC 101, and transmitting and receiving data to/from other NFC terminals.

The operation panel 305 is provided with, for example, a touch panel which is an operation mechanism on the LCD. Although, in the present exemplary embodiment, the operation unit is integrally formed with at least a part of the display unit, the configuration is not limited thereto. The display unit may be provided separately from the operation unit. The operation panel 305 displays various information for operating the printing apparatus 300.

The CPU 311 controls the operation unit control circuit 320 to perform a display on the operation panel 305 and receive an operation from a user.

The image memory 316 stores image data acquired from the outside via the wireless LAN 102 or the NFC 101. The CPU 311 is also able to transmit image data in the image memory 316 to the outside.

The printing unit 317 performs printing on a recording medium based on image data. The printing unit 317 performs a printing operation, for example, by discharging ink. The scanner 315 is able to scan a document placed on a document plate (not illustrated) to acquire image data. The acquired image data is stored in the image memory 316.

Figure 12:
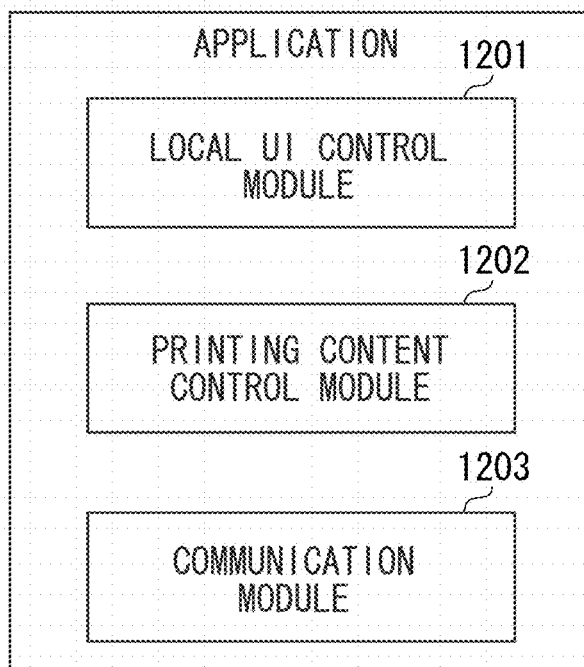
FIG. 12 illustrates a configuration of an application according to the first exemplary embodiment.

An application operating on the terminal apparatus 200 will be described below with reference to FIG. 12. FIG. 12 illustrates a configuration of application software according to the present exemplary embodiment. An application includes a local user interface (UI) control module 1201, a printing content control module 1202, and a communication module 1203.

The local UI control module 1201 controls display of the touch panel display 204 of the terminal apparatus 200. More specifically, although described in detail below, the local UI control module 1201 displays a top screen and controls buttons on the top screen. The local UI control module 1201 also displays screens other than screens processed by the printing content control module 1202 and controls buttons on these screens.

The printing content control module 1202 displays a printing content acquired from the content management server 400 and performs screen control. According to the present exemplary embodiment, the printing content control module 1202 will be described below as WebView. The communication module 1203 performs communication processing via the circuit connection unit 203 or the wireless LAN unit 202.

More specifically, the local UI control module 1201 is a portion which is directly controlled by an application, and the printing content control module 1202 is a portion which is controlled by an application through HTML processing by using WebView. Since a high-speed operation is demanded for buttons displaying the printing purpose and buttons provided with category information, it is desirable that these buttons are directly controlled by an application operating within the terminal apparatus 200. Therefore, the buttons displaying the printing purpose and the buttons provided with category information are controlled by the local UI control module 1201. On the other hand, the development cost related to printing content control processing can be reduced by generating a large volume of printing contents based on the HTML and processing them by using WebView.

A screen provided by an application illustrated in FIG. 12 is displayed on the touch panel display 204 of the terminal apparatus 200. The user is able to operate the printing apparatus 300 via screens displayed on the touch panel display 204 of the terminal apparatus 200.

Figure 4A:
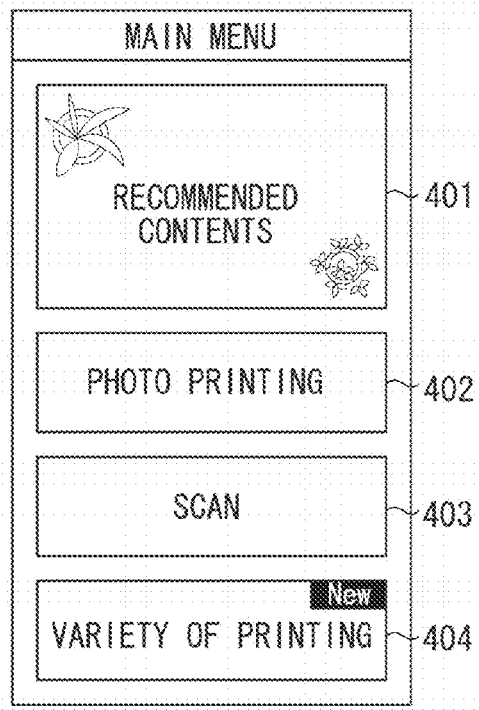
FIGS. 4A and 4B respectively illustrate a top screen according to the first exemplary embodiment.
Figure 4B:
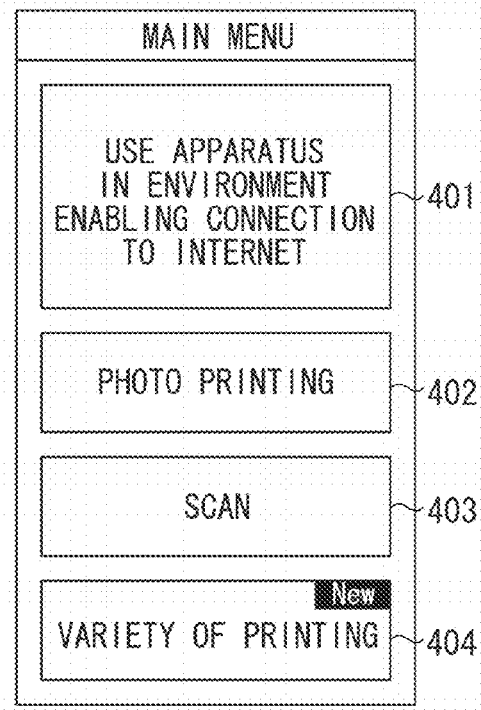

FIGS. 4A and 4B each illustrate a top screen provided by an application according to the present exemplary embodiment. In the present exemplary embodiment, the top screen displays a main menu. More specifically, the top screen includes a "Photo Printing" button 402, a "Scan" button 403, a "Variety of Printing" button 404, and a content information display area 401 for introducing a content. The "Photo Printing" button 402, the "Scan" button 403, and the "Variety of Printing" button 404 can be respectively tapped (selected).

The application displays in the content information display area 401 a content introduction page acquired from the content management server 400 via the Internet. More specifically, when the terminal apparatus 200 is connected to the Internet, the content introduction page acquired from the content management server 400 is displayed in the content information display area 401. Referring to FIG. 4A, the content information display area 401 displays a content recommended to the user out of printing contents handled by an application. Data of the content introduction page is controlled and displayed by WebView (printing content control module 1202). The data of the content introduction page is, for example, composed of the HTML. When the application transfers the page data to WebView (printing content control module 1202), WebView interprets the page data and displays the content introduction page in the content information display area 401.

When the terminal apparatus 200 is unable to acquire the page data of the content introduction page from the content management server 400 via the Internet, for example, when the terminal apparatus 200 is in an environment where the terminal apparatus 200 is unable to connect to the Internet, the application displays in the content information display area 401 an image provided by the local UI control module 1201. More specifically, when the terminal apparatus 200 is not connected to the Internet, the application displays in the content information display area 401 a message for enabling the user to recognize that the terminal apparatus 200 is not connected to the Internet. In the present exemplary embodiment, the main menu displays an image containing a message for prompting the user to connect the terminal apparatus 200 to the Internet, as illustrated in FIG. 4B. Although an image containing a message "Use Apparatus in Environment Enabling Connection to Internet" is displayed in the main menu illustrated in FIG. 4B, the image is not limited thereto. The image illustrated in FIG. 4B enables the user to recognize that the terminal apparatus 200 is unable to connect to the Internet.

When the user taps the "Photo Printing" button 402, the screen changes to display a list of image data stored in the image memory 220 in the terminal apparatus 200 (not illustrated). When the user selects a desired image and taps a Print button, the selected photograph can be printed. When the user taps the "Scan" button 403, the scanner 315 scans a document set in the printing apparatus 300 to acquire scanned image data, and a preview screen of the image data is displayed. When the user taps the "Variety of Printing" button 404, the screen changes to display the "Variety of Printing" screen. The buttons displayed on the top screen are directly controlled by an application operating within the terminal apparatus 200. More specifically, the buttons displayed on the top screen are controlled by the local UI control module 1201.

FIG. 5 illustrates a screen displaying a menu of variety of printing (hereinafter also referred to as a "Variety of Printing" menu screen) provided by an application. The "Variety of Printing" menu screen is displayed when the user taps the "Variety of Printing" button 404 in the main menu illustrated in FIGS. 4A and 4B. The "Variety of Printing" menu screen includes a "Select from Category" button 501, a "Use Test Printing Paper" button 502, a "Favorites" button 503, a "History" button 504, and a return button 505.

When the user taps the "Select from Category" button 501, the screen changes to display a category selection screen. When the user taps the "Use Test Printing Paper" button 502, the screen changes to display a list of printing contents to be printed on test printing paper attached to the printing apparatus 300. When the user taps the "Favorites" button 503, the screen chances to display a list of user s favorite printing contents. More specifically, in a state where specific information is added to user's favorite printing contents, when the user taps the "Favorites" button 503, only printing contents having the added specific information are displayed in a list of user s favorite printing contents. When the user taps the "History" button 504, the screen changes to display a list of printing contents previously printed by the user. When the user taps the return button 505, the screen returns to the top screen. The buttons displayed in the Variety of Printing screen are directly controlled by an application operating in the terminal apparatus 200. More specifically, these buttons are controlled by the local UI control module 1201.

FIG. 6 illustrates a printing category selection screen (hereinafter also referred to as a "Select from Category" screen). The "Select from Category" screen is provided via the Internet. On the "Select from Category" screen, the user is able to tap a "Greeting Card" button 601, a "Gift Box" button 602, and a "Paperback" button 603. When the user taps each button, the screen changes to display a list of printing contents in the category described on the selected button. The buttons displayed in the "Select from Category" screen are displayed and controlled by WebView which interpreted the printing content. More specifically, these buttons are controlled by the printing content control module 1202. When the user taps a return button 604, the screen returns to the "Variety of Printing" menu screen.

Figure 7:
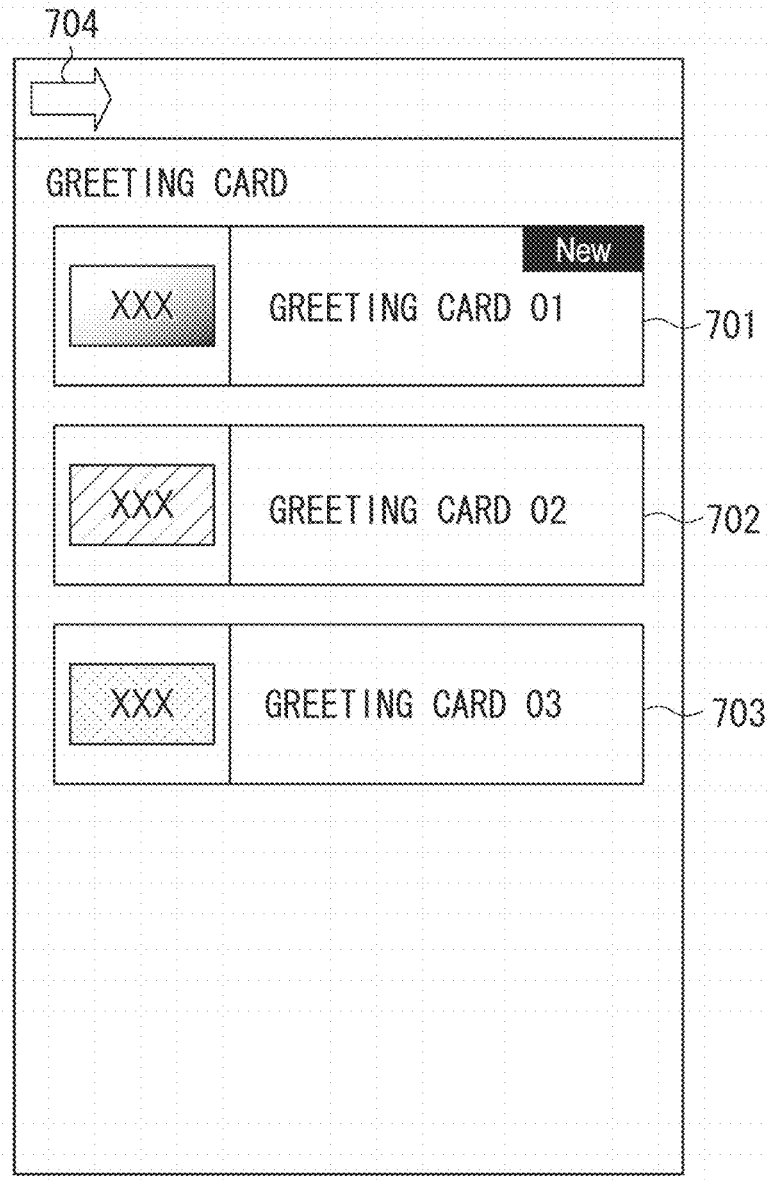
FIG. 7 illustrates a printing content selection screen according to the first exemplary embodiment.

FIG. 7 illustrates a printing content selection screen (hereinafter also referred to as a content selection screen). The printing content selection screen is provided via the Internet. FIG. 7 illustrates an example of a screen for displaying a list of printing contents of greeting cards. The content selection screen changes to display a list of printing contents to be printed. FIG. 7 illustrates example display of three different types of greeting cards (greeting cards 701 to 703). When the user taps a return button 704, the screen returns to the "Select from Category" screen.

Figure 8:
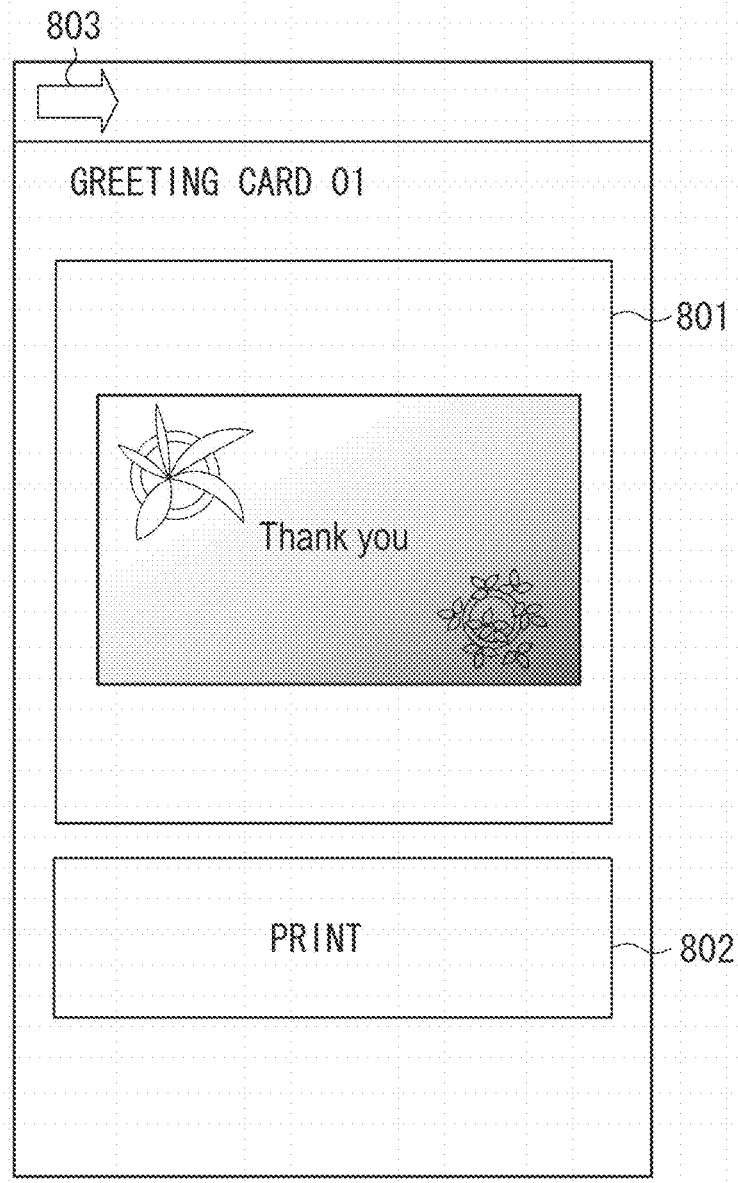
FIG. 8 illustrates a printing content confirmation screen according to the first exemplary embodiment.

FIG. 8 illustrates a printing content confirmation screen (hereinafter also referred to as a content confirmation screen). The printing content confirmation screen is provided via the Internet. The content confirmation screen includes a display area 801 for displaying detailed information of the printing content selected in the content selection screen, a "Print" button 802, and a return button 803. In this case, the display area 801 displays a printing content preview image. When the user taps the "Print" button 802, printing starts. When the user taps the return button 803, the screen returns to the content selection screen.

FIG. 9 illustrates management information 900 for controlling whether to display a mark indicating the presence of update information on objects (buttons in the present exemplary embodiment) directly controlled by an application operating in the terminal apparatus 200. In the present exemplary embodiment, a "New" mark is displayed on each object as a mark indicating the presence of update information. More specifically, when update information is present, the New mark is displayed on an object. The management information 900 includes button name information 901, New mark display ON/OFF information 902, display start date/time information 903, and display end date/time information 904. Referring to FIG. 9, the "Variety of Printing" button 404 is subjected to New mark display which starts at 12:00 a.m. on May 20, 2015 and ends at 11:59 p.m. on Jul. 20, 2015. The "Select from Category" button 501 is subjected to New mark display which starts at 12:00 a.m. on May 20, 2015 and ends at 11:59 p.m. on Jun. 19, 2015. The "Use Test Printing Paper" button 502 is subjected to New mark display which starts at 12:00 a.m. on Jun. 20, 2015 and ends at 11:59 p.m. on Jul. 20, 2015. On the other hand, the "Favorites" button 503 and the "History" button 504 are not subjected to New mark display. An application acquires the management information 900 from the content management server 400, and stores it in the nonvolatile memory 221 of the terminal apparatus 200 in a file format. When an application is installed, an empty management file may be stored, or information determined at the time of installation may be input.

As illustrated in FIGS. 4A, 4B, and 5, the "Variety of Printing" button 404 (object) illustrated in FIGS. 4A and 4B is associated with the "Select from Category" button 501, the "Use Test Printing Paper" button 502, the "Favorites" button 503, and the "History" button 504. More specifically, objects are hierarchically constructed. Based on update information of lower layer objects, New mark display ON/OFF, the display start date/time, and the display end date/time are set to each upper layer object. In other words, when New mark display is set to ON for any lower layer object, New mark display is set to ON for upper layer objects. In this case, the display start date/time and the display end date/time of each lower layer object (button) are reflected to the display start date/time and the display end date/time of upper layer objects. More specifically, the display start date/time of a top layer object ("Variety of Printing" button) displayed on the top screen is set to the earliest display start date/time of lower layer objects (the "Select from Category", "Use Test Printing Paper", "Favorites", and "History" buttons) displayed on the "Select from Category" screen. Further, the display end date/time of a top layer object displayed on the top screen is set to the latest display end date/time of lower layer objects displayed on the "Select from Category" screen.

In the present exemplary embodiment, an application performs a screen display based on the management information 900 as illustrated in FIG. 9. As described above, in the present exemplary embodiment, the display start date/time and the display end date/time of the New mark are set for each button. The New mark can be kept being displayed since the display start date/time till the display end date/time.

The application acquires the management information 900 at a timing when the terminal apparatus 200 is connectable to the content management server 400, and stores the information in the nonvolatile memory 221. Then, the application performs a screen display based on the management information 900 in the nonvolatile memory 221. More specifically, even in an environment where the terminal apparatus 200 is unable to connect to the Internet, the New mark can be displayed when the start date/time of the New mark comes based on the management information 900 in the nonvolatile memory 221.

The update information display (New mark display) is not performed for objects (buttons) not managed by the management information 900 as illustrated in FIG. 9.

Processing flow according to the present exemplary embodiment will be described below with reference to FIGS. 10 and 13 to 15. FIGS. 10 and 13 to 15 are flowcharts illustrating processing by application software. Processing is performed when the CPU 211 loads a program of the application software stored in the nonvolatile memory 221 into the data memory 214 and then executes it.

Figure 10:
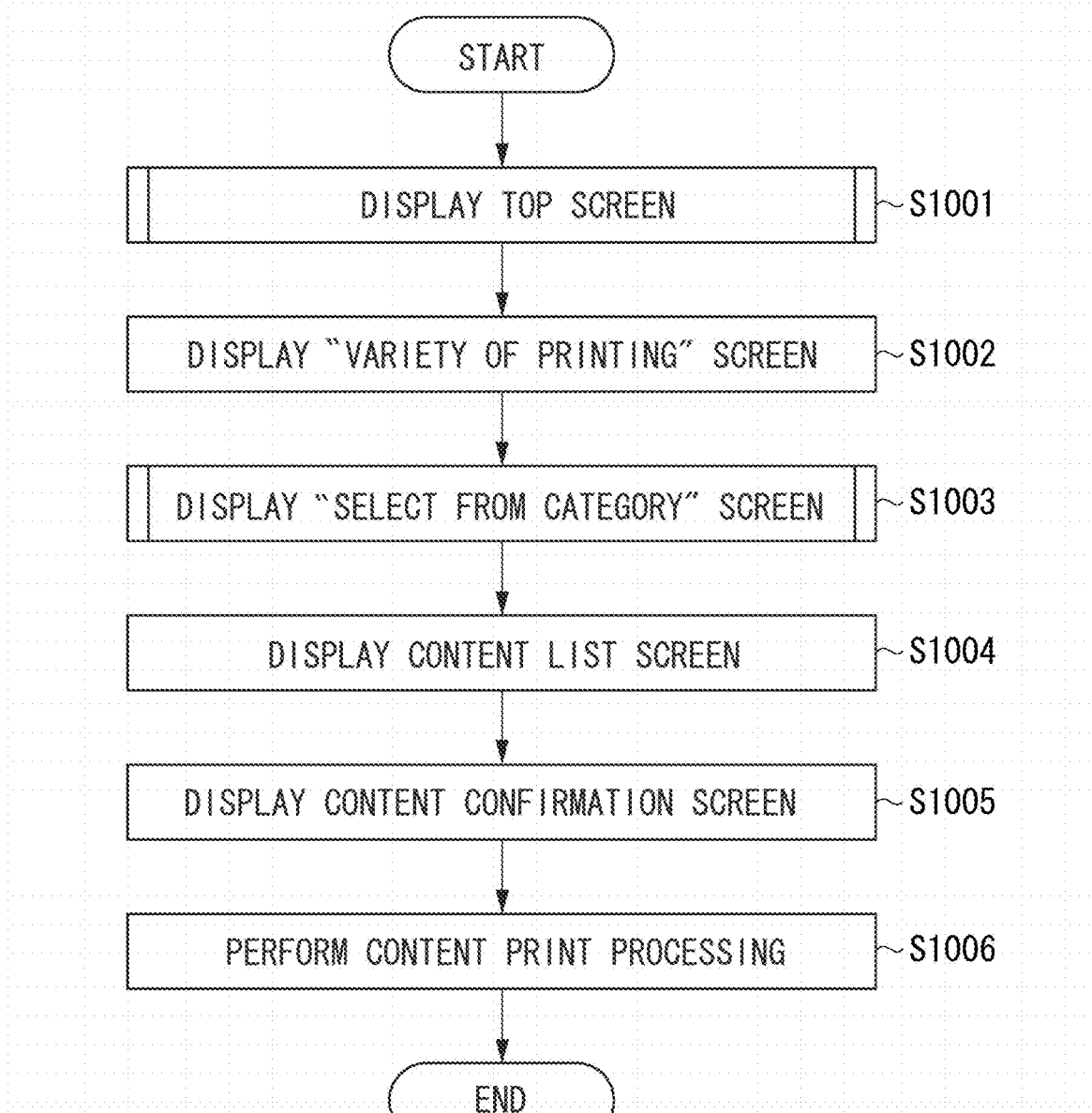
FIG. 10 is a flowchart illustrating details of processing according to the first exemplary embodiment.

When the user operates the touch panel display 204 of the terminal apparatus 200 to activate an application, processing in the flowchart illustrated in FIG. 10 starts. In step S1001, the application displays the top screen. Top screen display processing will be described below with reference to a flowchart illustrated in FIG. 13. In step S1301, the application attempts to acquire data of the content introduction page. In step S1302, the application determines whether the data of the content introduction page has been successfully acquired. When the page data has not been successfully acquired (NO in step S1302), then in step S1303, the application displays in the content information display area 401 a message for prompting the user to use the terminal apparatus 200 in an environment enabling connection to the Internet, as illustrated in FIG. 4B. Then, the processing proceeds to step S1306. On the other hand, when the page data has been successfully acquired (YES in step S1302), then in step S1304, the application displays the acquired data of the content introduction page in the content information display area 401. The acquired page data is, for example, composed of the HTML. When the application transfers the acquired page data to WebView, WebView reads the data and displays the data in the content information display area 401. In step S1305, since communication with the content management server 400 is established in a case where the data of the content introduction page has been acquired, the application acquires the management information 900 and updates the management information 900 of the file in the nonvolatile memory 221 in the terminal apparatus 200. Then, the processing proceeds to step S1306. In step S1306, the application performs button display processing. Thus, in the present exemplary embodiment, the application acquires not only the data of the content introduction page but also the management information 900 at the application start timing.

The button display processing in step S1306 will be described below with reference to FIG. 14. The application repeats the processing in steps S1401 to S1406 the number of times corresponding to the number of objects (buttons) to be displayed on the top screen. In step S1401, the local UI control module 1201 displays one button. In step S1402, the application refers to the management information 900 of the button displayed in step S1401 out of the management information 900 in the nonvolatile memory 221. More specifically, the application acquires the New mark display ON/OFF information 902 corresponding to the displayed button from the management information 900. In this case, even if the management information 900 cannot be acquired in step S1301, the management information 900 remains stored if the management file had been acquired when the application was activated before step S1301. In other words, even if the management information 900 cannot be acquired via a network at the present application start timing, the management information 900 remains stored in the nonvolatile memory 221 once the management information 900 has been acquired. This means that New mark display is possible even without network connection.

In step S1403, the application determines whether the target object is subjected to New mark display. In other words, the application determines whether to notify the user of an update of the content for the target object. For example, since the New mark display ON/OFF information 902 is "ON" for the "Variety of Printing" button 404, the application determines that the "Variety of Printing" button 404 is an object subjected to New mark display. When the application determines that the target object is subjected to New mark display (YES in step S1403), then in step S1404, the application acquires the present time from the terminal apparatus 200 and acquires the display start date/time information 903 and the display end date/time information 904 from the management information 900. In step S1405, the application determines whether a predetermined condition is satisfied, more specifically, whether the present time is between the display start date/time and the display end date/time. When the application determines that the condition is satisfied (YES in step S1405), then in step S1406, the application displays the New mark. Then, the processing proceeds to step S1407. More specifically, in step S1406, the application notifies the user of an update of the content for the target object. Then, the processing proceeds to step S1407. For example, when the present time is 12:00 p.m. on Jun. 1, 2015, the application display the New mark for the "Variety of Printing" button 404. Then, the processing proceeds to step S1407. On the other hand, when the predetermined condition is not satisfied (NO in step S1405), i.e., when the present time is before the display start date/time or after the display end date/time, the application does not display the New mark for the "Variety of Printing" button 404. Then, the processing proceeds to step S1407. In step S1407, the application determines whether all of buttons that should be displayed on the top screen have been displayed. When all of the buttons have been displayed (YES in step S1407), the processing ends. When not all of the buttons have been displayed (NO in step S1407), the processing returns to step S1401. In addition to the "Variety of Printing" button 404, the buttons which should be displayed on the top screen include the "Photo Printing" button 402, the "Scan" button 403, etc. The New mark is not displayed for these buttons since there is no corresponding information in the management information 900.

Referring to FIG. 10 again, in step S1002, when the user taps the "Variety of Printing" button 404, the "Variety of Printing" screen as illustrated in FIG. 5 is displayed. The application performs similar processing to the top screen button display processing illustrated in FIG. 14 to display buttons in the "Variety of Printing" screen. In this case, when the user taps the return button 505 in the "Variety of Printing" screen, then in step S1002, the application performs the top screen display processing, i.e., the processing illustrated in FIG. 14. Therefore, when the user selects the return button 505, the New mark is redisplayed on the "Variety of Printing" button 404 on the top screen illustrated in FIGS. 4A and 4B.

When the user taps the "Photo Printing" button 402, a photo printing execution request is transmitted to the printing apparatus 300, and the printing apparatus 300 performs photo printing. When the user taps the "Scan" button 403, a scan execution request is transmitted to the printing apparatus 300, and the printing apparatus 300 performs scanning. Descriptions about these operations will be omitted in FIG. 10.

When the user taps the "Select from Category" button 501 on the "Variety of Printing" screen, the "Select from Category" screen as illustrated in FIG. 6 provided via the Internet is displayed. When the user taps the "Use Test Printing Paper" button 502, the screen changes to display a list of printing contents to be printed on test printing paper attached to the printing apparatus 300. When the user taps the "Favorites" button 503, the screen changes to display a list of user's favorite printing contents. When the user taps the "History" button 504, the screen changes to display a list of printing contents previously printed by the user. Descriptions of these screens will be omitted in FIG. 10.

The "Select from Category" screen display processing will be described below with reference to FIG. 15. In step S1501, the application attempts to acquire data of the category list page. In step S1502, the application determines whether the page data has been successfully acquired. When the page data has not been successfully acquired NO in step S1502), then in step S1503, the application displays in the content information display area 401 a message for prompting the user to use the terminal apparatus 200 in an environment enabling connection to the Internet. The application may display a message in the content information display area 401, for example, by using a similar method to that in step S1303. On the other hand, when the page data has been successfully acquired (YES in step S1502), then in step S1504, the application displays a category list in the content information display area 401. Page data is composed of the HTML. The data of this page is displayed by WebView as illustrated in FIG. 6. The New mark is displayed on the "Greeting Card" button 601" in the "Select from Category" screen illustrated in FIG. 6. The New mark is not the one added by the local UI control module 1201 based on information acquired from the management information 900. More specifically, the New mark information included in the data of the category list page is displayed by WebView. Thus, when the application displays a printing content acquired from the content management server 400, the application does not directly supply the New mark. In step S1505, the application acquires the management information 900 and updates information of a file holding the management information 900 in the terminal apparatus 200.

When the user taps the return button 604 in the "Select from Category" screen, then in step S1002, the application performs "Variety of Printing" screen display processing, i.e., the processing illustrated in FIG. 14. Therefore, when the user selects the return button 604, the New mark is redisplayed on the "Select from Category" button 501 in the "Variety of Printing" screen illustrated in FIG. 5.

Referring to FIG. 10 again, in step S1004, when the user selects a desired category in the "Select from Category" screen, the printing content selection, screen (a list of contents of the selected category) as illustrated in FIG. 7 is displayed. The data of the printing content selection screen is acquired from the content management server 400. More specifically, the printing content selection screen is provided via the Internet. Since processing for displaying this page is similar to the "Select from Category" screen display processing, and redundant descriptions thereof will be omitted. The data of the printing content selection screen is composed of the HTML. The data of this page is displayed by WebView as illustrated in FIG. 6. The New mark is not the one added by the local UI control module 1201 based on information acquired from the management information 900. More specifically, the New mark information included in the data of the category list page is displayed by WebView. In step S1005, when the user selects a desired printing content in the printing content selection screen, the printing content confirmation screen illustrated in FIG. 8 is displayed. In step S1006, when the user taps the "Print" button 802 in the printing content confirmation screen, the application acquires image data to be printed from the content management server 400, adds a printing command to the image data, and transmits the data to the printing apparatus 300. A method for displaying data in the display area 801 in the printing content confirmation screen is similar to that in a flowchart illustrated in FIG. 15, and redundant descriptions thereof will be omitted.

In the present exemplary embodiment, the application acquires information of the management information 900 at a communicable timing, and stores the information in the nonvolatile memory 221. When the management information 900 has already been stored in the nonvolatile memory 221, the application updates the management information 900. Then, based on the management information 900 stored in the nonvolatile memory 221, the application controls whether to display the New mark on buttons directly controlled by the application. In this case, even if the management information 900 cannot be acquired in step S1301, the management information 900 remains stored if the management file had been acquired when the application was activated before step S1301. Thus, the New mark can be displayed even under a situation where the terminal apparatus 200 is unable to connect to the Internet.

The display start date/time and the display end date/time are specified in the management information 900 illustrated in FIG. 9, and the New mark is displayed in the specified period. More specifically, the New mark is displayed when the display start date/time comes even in the off-line state. This enables leading the user to connect to the Internet. After the specified period has elapsed, the New mark is not left displayed. A future time can be set as the display start date/time managed in the management information 900. Therefore, when a specific time comes, the New mark is displayed notifying the user that a content has been updated. Further, in the above-described exemplary embodiment, update information is set for each object, as illustrated in FIG. 9, and update information of an upper layer object is set based on update information of its lower layer object. More specifically, when the New mark is displayed on a lower layer object, the New mark is displayed on its upper layer object. This enables the user to recognize that there is an updated content in a lower layer by confirming each upper layer object (the "Variety of Printing" button 404 in the present exemplary embodiment).

During the specified display period (since the display start date/time time till the display end date/time), keeping displaying the New mark enables notifying the user that the target content has been updated lately. More specifically, suitably setting the display period of the New mark enables displaying the New mark during a predetermined period even in the off-line state.

In the present exemplary embodiment, a plurality of display start dates/times and a plurality of display end dates/times can be set for each object. Descriptions of a similar configuration to the first exemplary embodiment will be omitted. As illustrated in FIG. 11, in the management information 900, a plurality of display start dates/times 903 and a plurality of display end dates/times 904 can be set for each button. For example, when the New mark is displayed on any button (any lower layer object) arranged in subsequent screens related to the "Variety of Printing" button 404 of the top screen, the New mark is also displayed on the "Variety of Printing" button 404. For example, based on the management information 900 illustrated in FIG. 11, the New mark is displayed on the "Select from Category" button 501 illustrated in FIG. 5 since 12:00 a.m. on May 20, 2015 till 11:59 p.m. on Jun. 19, 2015. The New mark is displayed on the "Use Test Printing Paper" button 502 since 12:00 a.m. on Aug. 1, 2015 till 11:59 p.m. on Sep. 1, 2015. Therefore, setting is made so that the New mark is displayed on the "Variety of Printing" button 404 illustrated in FIGS. 4A and 4B in the two different periods during which the New mark is displayed on the two buttons (the "Select from Category" button 501 and the "Use Test Printing Paper" button 502). More specifically, a plurality of the display start dates/times 903 and a plurality of the display end dates/times 904 are set on the "Variety of Printing" button 404, as illustrated in FIG. 11. Thus, the New mark can be displayed on the "Variety of Printing" button 404 during a plurality of periods.

According to the present exemplary embodiment, the application is able to notify the user of update information at a desired timing even in an environment where communication is not possible.

The present invention is not limited to the above-described exemplary embodiment. For example, although, in the above-described exemplary embodiment, the New mark is displayed on a predetermined object (button) according to the contents of the management information 900, the display method is not limited thereto. For example, based on the management information 900, the color, the information may be changed. Further, objects including update information may be blinked. The object display method may be changed in this way.

In the above-described exemplary embodiment, if the management information 900 has already been stored in the nonvolatile memory 221 when the application acquires management information 900 from the content management server 400, the application updates the management information 900. However, the update method is not limited thereto, and management information may be added.

Although, in the above-described exemplary embodiment, a printing content is used as an example of a content, the content is not limited thereto, and may be, for example, a music content.

In the above-described exemplary embodiment, the management information 900 does not include information about the "Photo Printing" button 402 and the "Scan" button 403. Further, the application does not display update information for objects not managed in the management information 900. However, the display method is not limited thereto. For example, in the management information 900, the New mark display ON/OFF information 902 corresponding to these buttons may be set to "OFF."

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise-one or more processors (e.g., central processing unit (CPU), micro processing unit (MPU)) and may include a network of separate computers or separate processors to read out and execute the computer executable instructions. The computer executable instructions may be provided, to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132163, filed Jun. 30, 2015, which is hereby incorporated by reference herein in its entirety.

What is claimed is:

1. An information processing apparatus comprising:
one or more processors operating to:
cause a display to display a first object, wherein the first object is provided by an application,
cause the display to display a second object, wherein the second object is included in page data in a HyperText Markup Language (HTML) form acquired via the Internet,
acquire management information from an external management apparatus, wherein the management information includes timing information specifying a period during which information indicating an update of a content managed by the external management apparatus may be displayed on the display, and
control a memory to store the management information acquired from the external management apparatus,
wherein, if a timing when the first object is displayed is within the period based on the management information stored in the memory, information, for the first object, indicating an update of the content is displayed by the application, and
wherein, if the page data in the HTML form acquired via the Internet includes information indicating an update of the content, information, for the second object, indicating an update of the content is displayed, and
wherein the displayed information, for the second object, indicating the update of the content is not based on the management information and not provided by the application.

2. The information processing apparatus according to claim 1, the one or more processors further operating to determine whether a timing when the first object is displayed is within the period by the application based on the management information stored in the memory, wherein, if it is determined that the timing when the first object is displayed is within the period, the information for the first object indicating an update of the content is displayed on a first screen provided by the application.

3. The information processing apparatus according to claim 2, wherein, in a case where the information processing apparatus is connected to the Internet, information based on the page data acquired via the Internet is displayed on the first screen provided by the application, and wherein, in a case where the information processing apparatus is not connected to the Internet, information, for enabling recognition that the information processing apparatus is not connected to the Internet, is displayed on the first screen provided by the application.

4. The information processing apparatus according to claim 1, wherein a second screen is displayed based on the page data acquired via the Internet, and wherein the second object is displayed on the second screen.

5. The information processing apparatus according to claim 1, wherein, when acquiring the page data, the management information is acquired.

6. The information processing apparatus according to claim 1, wherein, in the case where the first object is displayed on a first screen provided by the application, the content update information is displayed based on the management information stored in the memory, and wherein, in the case where the second object is displayed on a second screen provided by WebView by acquiring via the Internet, the content update information is displayed if the content update information is included in the page data acquired via the Internet.

7. The information processing apparatus according to claim 6, wherein, in response to the first object being selected on the first screen provided by the application, the second screen provided by WebView is displayed for selecting the content.

8. The information processing apparatus according to claim 1, wherein, when connecting to the external management apparatus via the Internet, the management information is acquired, and wherein, in a case where the management information is acquired, the management information is updated in the memory.

9. The information processing apparatus according to claim 1, wherein objects including the first object are hierarchically constructed, and wherein, based on the management information of a lower layer object, information indicating an update is displayed on upper layer objects.

10. The information processing apparatus according to claim 9, wherein the management information is a management file for managing information about the information indicating an update for each object to be displayed on the display unit, and wherein whether the content update information is displayed is determined for each object.

11. The information processing apparatus according to claim 1, wherein, as the content update information on the display, a display of an object for selecting the updated content is changed.

12. The information processing apparatus according to claim 11, wherein, as the content update information on the display, a mark is added to the object for selecting the updated content.

13. The information processing apparatus according to claim 11, wherein, as the content update information on the display, a color of the object for selecting the updated content is changed.

14. The information processing apparatus according to claim 11, wherein, as the content update information on the display, a background of the object for selecting the updated content is changed.

15. The information processing apparatus according to claim 1, wherein, even if the content is displayed as a result of the selection by user, the content update information is displayed within the managed period after the content is displayed.

16. A control method for an information processing apparatus having one or more processors operating to cause a display to display an image, the control method comprising:

causing the display to display a first object, wherein the first object is provided by an application;

causing the display to display a second object, wherein the second object is included in page data in a HyperText Markup Language (HTML) form acquired via the Internet;

acquiring management information from an external management apparatus, wherein the management information includes timing information specifying a period during which information indicating an update of a content managed by the external management apparatus may be displayed on the display; and controlling a memory to store the management information acquired from the external management apparatus, wherein, if a timing when the first object is displayed is within the period based on the management information stored in the memory, information, for the first object, indicating an update of the content is displayed by the application, and wherein, if the page data in the HTML form acquired via the Internet includes information indicating an update of the content, information, for the second object, indicating an update of the content is displayed, and wherein the displayed information, for the second object, indicating the update of the content is not based on the management information and not provided by the application.

17. The control method according to claim 16, wherein a second screen is displayed based on the page data acquired via the Internet, and wherein the second object is displayed on the second screen.

18. The control method according to claim 16, wherein, in a case where the information processing apparatus is connected to the Internet, information based on the page data acquired via the Internet is displayed on the first screen provided by the application, and wherein, in a case where the information processing apparatus is not connected to the Internet, information, for enabling recognition that the information processing apparatus is not connected to the Internet, is displayed on the first screen provided by the application.

19. The control method according to claim 16, wherein, in the case where the first object is displayed on a first screen provided by the application, the content update information is displayed based on the management information stored in the memory, and wherein, in the case where the second object is displayed on a second screen provided by WebView by acquiring via the Internet, the content update information is displayed if the content update information is included in the page data acquired via the Internet.

20. The control method according to claim 19, wherein, in response to the first object being selected on the first screen provided by the application, the second screen provided by WebView is displayed for selecting the content.

21. The control method according to claim 16, wherein, even if the content is displayed as a result of the selection by user, the content update information is displayed within the managed period after the content is displayed.

22. A non-transitory computer-readable recording medium storing a program to cause a computer to perform a control method for an information processing apparatus having one or more processors operating to cause a display to display an image, the control method comprising:
   causing the display to display a first object, wherein the first object is provided by an application;
   causing the display to display a second object, wherein the second object is included in page data in a HyperText Markup Language (HTML) form acquired via the Internet;
   acquiring management information from an external management apparatus, wherein the management information includes timing information specifying a period during which information indicating an update of a content managed by the external management apparatus may be displayed on the display; and
   controlling a memory to store the management information acquired from the external management apparatus,
   wherein, if a timing when the first object is displayed is within the period based on the management information stored in the memory, information, for the first object, indicating an update of the content is displayed by the application, and
   wherein, if the page data in the HTML form acquired via the Internet includes information indicating an update of the content, information, for the second object, indicating an update of the content is displayed, and
   wherein the displayed information, for the second object, indicating the update of the content is not based on the management information and not provided by the application.

23. A method for an information processing apparatus having a memory, an interface, and a display, the method comprising:
   storing, in the memory, first management information acquired via a network from an external management apparatus, wherein the first management information includes timing information specifying a period during which information indicating an update of a content managed by the external management apparatus may be displayed on the display;
   activating an application based on a user operating the display;
   sending, in response to the application being activated, a request through the interface to the external management apparatus to acquire data; and
   displaying, on the display, a first object provided by the application, and the content update information for the first object,
   wherein, in a case where the requested data is acquired, the first management information is updated to second management information acquired from the external management apparatus and displaying includes displaying the content update information for the first object based on the timing information from the second management information stored in the memory, and
   wherein, in a case where communications with the external management apparatus is not possible such that the requested data is not acquired, displaying includes displaying the content update information for the first object based on the timing information from the first management information stored in the memory such that content update information display is possible even without network connection.

24. The method according to claim 23, wherein, in the case where communications with the external management apparatus is not possible such that the requested data is not acquired and present time for the information processing apparatus is within the timing information stored in the memory, displaying includes displaying the first object and the content update information for the first object on the display.

25. The method according to claim 23, wherein, in the case where communications with the external management apparatus is not possible such that the requested data is not acquired and present time for the information processing apparatus is outside of the timing information stored in the memory, displaying includes displaying the first object without displaying the content update information for the first object on the display.

26. The method according to claim 23, further comprising acquiring the first management information in response to installing an application in the information processing apparatus.

27. The method according to claim 23, further comprising sending, from the information processing apparatus to a printing apparatus in response to a user operating the first object, data based on content managed by the external management apparatus that causes the printing apparatus to output a printed paper sheet based on the printing content data.

28. The method according to claim 23,
   wherein the information processing apparatus is one of a personal digital assistant, a mobile phone, and a digital camera,
   wherein the content managed by the external management apparatus is one of a music content and a printing content for printing one of a greeting card, a label, and a menu list,
   wherein the display is provided with an operation mechanism on a liquid crystal display,
   wherein the memory is a nonvolatile memory,
   wherein the case where communications with the external management apparatus is not possible includes determining that the information processing apparatus is not connected to the Internet,
   wherein displaying the content update information for the first object on the display includes displaying a New mark on the first object on the display,
   wherein the data is page data for the printing content,
   wherein the content update information for the first object is such that the content update information leads the user to connect the information processing apparatus to the external management apparatus through the Internet, and
   wherein the content update information for the first object changes at least one of a color, background, shape, and visibility of the first object.

29. The method according to claim 23,
   wherein a second object is configured to be displayed in response to a user operating the first object, and wherein displaying the content update information for the first object on the display is based on the timing information for the second object stored in the memory.

30. The method according to claim 29, wherein the application providing the first object and the second object operates within the information processing apparatus and, in response to a user operating the second object, a third object received from the external management apparatus is configured to be displayed on the display and controlled by WebView.

31. The method according to claim 30, wherein, in a case where communications with the external management apparatus is not possible such that the requested data is not acquired, displaying includes displaying the content update information for the first object on the display based on the timing information for the second object stored in the memory without displaying content update information for the third object.

32. An information processing apparatus comprising:
a memory configured to store first management information acquired via a network from an external management apparatus, wherein the first management information includes timing information specifying a period during which information indicating an update of a content managed by the external management apparatus may be displayed on the display;
a display configured to be operated by a user to activate an application;
an interface configured to send, in response to the application being activated, a request to the external management apparatus to acquire data; and
a controller configured to display, on the display, a first object provided by the application and to display the content update information for the first object,
wherein, in a case where the requested data is acquired, the controller updates the first management information to second management information acquired from the external management apparatus and displays the content update information for the first object based on the timing information from the second management information stored in the memory, and
wherein, in a case where communications with the external management apparatus is not possible such that the requested data is not acquired, the controller displays the content update information for the first object based on the timing information from the first management information stored in the memory such that content update information display is possible even without network connection.

33. The information processing apparatus according to claim 32, wherein, in the case where communications with the external management apparatus is not possible such that the requested data is not acquired and present time for the information processing apparatus is within the timing information stored in the memory, the controller displays the first object and the content update information for the first object on the display.

34. The information processing apparatus according to claim 32, wherein, in the case where communications with the external management apparatus is not possible such that the requested data is not acquired and present time for the information processing apparatus is outside of the timing information stored in the memory, the controller displays the first object without displaying the content update information for the first object on the display.

35. The information processing apparatus according to claim 32, wherein the interface further is configured to acquire the first management information in response to installing an application in the information processing apparatus.

36. The information processing apparatus according to claim 32, wherein the interface further is configured to send, from the information processing apparatus to a printing apparatus in response to a user operating the first object, data based on content managed by the external management apparatus that is configured to cause the printing apparatus to output a printed paper sheet based on the printing content data.

37. The information processing apparatus according to claim 32,
wherein the information processing apparatus is one of a personal digital assistant, a mobile phone, and a digital camera,
wherein the content managed by the external management apparatus is one of a music content and a printing content for printing one of a greeting card, a label, and a menu list,
wherein the display is provided with an operation mechanism on a liquid crystal display,
wherein the memory is a nonvolatile memory,
wherein the case where communications with the external management apparatus is not possible includes the controller determining that the information processing apparatus is not connected to the Internet,
wherein the controller displaying the content update information for the first object on the display includes displaying a New mark on the first object on the display,
wherein the data is page data for the printing content,
wherein the content update information for the first object is such that the content update information leads the user to connect the information processing apparatus to the external management apparatus through the Internet, and
wherein the content update information for the first object changes at least one of a color, background, shape, and visibility of the first object.

38. The information processing apparatus according to claim 32,
wherein a second object is configured to be displayed in response to a user operating the first object, and
wherein the controller displaying the content update information for the first object on the display is based on the timing information for the second object stored in the memory.

39. The information processing apparatus according to claim 38, wherein the application providing the first object and the second object operates within the information processing apparatus and, in response to a user operating the second object, a third object received from the external management apparatus is configured to be displayed on the display and controlled by WebView.

40. The information processing apparatus according to claim 39, wherein, in a case where communications with the external management apparatus is not possible such that the requested data is not acquired, the controller displays the content update information for the first object on the display based on the timing information for the second object stored in the memory without displaying content update information for the third object.

41. A non-transitory computer-readable recording medium storing a program to cause a computer to perform a method for an information processing apparatus having a memory, an interface, and a display, the method comprising:

storing, in the memory, first management information acquired via a network from an external management apparatus, wherein the first management information includes timing information specifying a period during which information indicating an update of a content managed by the external management apparatus may be displayed on the display;

activating an application based on a user operating the display;

sending, in response to the application being activated, a request through the interface to the external management apparatus to acquire data; and displaying, on the display, a first object provided by the application, and the content update information for the first object, wherein, in a case where the requested data is acquired, the first management information is updated to second management information acquired from the external management apparatus and displaying includes displaying the content update information for the first object based on the timing information from the second management information stored in the memory, and wherein, in a case where communications with the external management apparatus is not possible such that the requested data is not acquired, displaying includes displaying the content update information for the first object based on the timing information from the first management information stored in the memory such that content update information display is possible even without network connection.

* * * * *